(12) United States Patent
Martin

(10) Patent No.: US 7,835,227 B2
(45) Date of Patent: Nov. 16, 2010

(54) STAGED SODAR SOUNDING

(75) Inventor: Andrew Louis Martin, Ferny Creek (AU)

(73) Assignee: Tele-IP Limited, Victoria (AU)

( * ) Notice: Subject to any disclaimer, the term of this patent is extended or adjusted under 35 U.S.C. 154(b) by 340 days.

(21) Appl. No.: 11/817,307

(22) PCT Filed: Feb. 28, 2006

(86) PCT No.: PCT/AU2006/000247

§ 371 (c)(1),
(2), (4) Date: May 8, 2008

(87) PCT Pub. No.: WO2006/089371

PCT Pub. Date: Aug. 31, 2006

(65) Prior Publication Data

US 2008/0285387 A1 Nov. 20, 2008

(30) Foreign Application Priority Data

Feb. 28, 2005 (AU) .............................. 2005900901

(51) Int. Cl.
*G01S 15/12* (2006.01)
(52) U.S. Cl. ...................... 367/87; 73/170.13
(58) Field of Classification Search ................. 367/87, 367/90; 73/170.13
See application file for complete search history.

(56) References Cited

U.S. PATENT DOCUMENTS

| | | | | |
|---|---|---|---|---|
| 3,675,191 | A | * | 7/1972 | McAllister ............... 73/170.13 |
| 4,558,594 | A | * | 12/1985 | Balser et al. ............. 73/170.13 |
| 5,521,883 | A | * | 5/1996 | Fage et al. .................... 367/90 |
| 5,544,525 | A | | 8/1996 | Peterman et al. |
| 5,615,173 | A | | 3/1997 | Brumley et al. |
| 5,808,580 | A | | 9/1998 | Andrews, Jr. |
| 6,448,923 | B1 | | 9/2002 | Zrnic et al. |
| 2004/0252586 | A1 | | 12/2004 | Martin |

FOREIGN PATENT DOCUMENTS

DE 198 05 328 A1 8/1999

(Continued)

OTHER PUBLICATIONS

Pinkel, R. et al. "Repeat-Sequence Coding for Improved Precision of Doppler Sonar and Sodar" Journal of Atmospheric and Oceanic Technology 9(2) pp. 149-163 1992, Whole document, especially section 3 and 5.

(Continued)

*Primary Examiner*—Ian J Lobo
(74) *Attorney, Agent, or Firm*—Hovey Williams LLP

(57) ABSTRACT

A monostatic sodar system (10) for atmospheric sounding includes a processor and display unit (12) that generates a set of acoustic chirps for transmission by transmitter 20. Discontinuities (22, 24 and 26) result in echoes (28, 30 and 32) being returned to a receiver (38) of system (10). Receiver (38) outputs extracted echo signals on line to the processor (12) for analysis. Detector (36) implements a Fourier domain matched-filter to extract echo signals from noise. By using a set of multiple chirps of increasing length with increasing intervals between them, substantially any feasible range can be accommodated using send-then-listen techniques with the benefit of high s/n performance.

12 Claims, 6 Drawing Sheets

FOREIGN PATENT DOCUMENTS

| WO | WO 01/67132 A1 | 9/2001 |
|----|----------------|--------|
| WO | WO 03/019230 A1 | 3/2003 |
| WO | WO 2004/077094 | 9/2004 |

OTHER PUBLICATIONS

Crescent1 G.H. "A Look back on Two Decades of Doppler Sodar Comparison Studies" Bulletin of the American Meteorological Society vol. 78, #4 pp. 651-673 1997, Abstract.

Bradley S.G. "Use of Coded Waveforms for Sodar Systems" Meteorology and Atmospheric Physics 71, 15-23 (1999), Whole document.

"Filling Balance FB13 and Balloon Treatment Technical Manual", FB13-US235en-1.2, Aug. 5, 1999, © Vaisala 1999.

Scintec product information "Acoustic Wind Profilers" document FAS 2004/Jan. 1, 2004. http://www.ctio.noao.edu/sitetests/Manuals/Product_Information_FAS_5.pdf http://web.archive.org/web/20041116184805/ http://www.ctio.noao.edu/sitetests/Manuals/Last modified Apr. 2, 2004, see section 2.5, and p. 2 bottom right.

* cited by examiner

| | Time ms | distance m | data start m | data end m | Range m |
|---|---|---|---|---|---|
| Total listen time | 21600 | | | | |
| Range listen time | 16200 | 2673 | | | |
| Guard time | 20 | 3.3 | 894.3 | 3567.3 | |
| Fourth Transmit Pulse | 5400 | 891 | | | |
| Total listen time | 7200 | | | | |
| Range listen time | 5400 | 891 | | | |
| Guard time | 20 | 3.3 | 300.3 | 1191.3 | |
| Third Transmit Pulse | 1800 | 297 | | | |
| Total listen time | 2400 | | | | |
| Range listen time | 1800 | 297 | | | |
| Guard time | 20 | 3.3 | 102.3 | 399.3 | |
| Second Transmit Pulse | 600 | 99 | | | |
| Total listen time | 700 | | | | |
| Range listen time | 600 | 99 | | | |
| Guard time | 20 | 3.3 | 19.8 | 118.8 | |
| First Transmit Pulse | 100 | 16.5 | | | |

STAGED SODAR SOUNDING

This is a national phase application in the United States of International Application PCT/AU2006/000247 filed 28 Feb. 2006, claiming priority from Australian application number 2005900901 filed 28 Feb. 2005, the disclosures of which are incorporated herein by reference.

BACKGROUND OF THE INVENTION

1. Field of the Invention

This invention relates to sodar methods and apparatus for atmospheric sounding using encoded pulses in the transmit-then-listen mode. The techniques of the invention have particular application to so-called 'monostatic' sodar configurations in which the receiver(s) is located 'up-range' near the transmitter and backscattered echoes are detected by the receiver. However, the methods of the invention are also applicable to so-called 'bistatic' sodar configurations where the receiver(s) is located down-range and forward-scattered echoes are detected.

2. Description of Related Art

Transmit-then-listen sodar sounding techniques, in which the transmission of a short high-intensity acoustic pulse is followed by a longer listening period in which echoes from the pulse are detected, are standard in the prior art and have been known for nearly 100 years. The basic problem with such techniques is that the pulse must be very short—preferably a few milliseconds—so that the transmit pulse ends before the echoes from short-range anomalies are returned and detected, otherwise the energy of the transmitted pulse will swamp the receiver. This is a particularly important consideration in monostatic systems where the receiver is located close to the transmitter. Two problems associated with the use of short pulses: they must have very high energy to achieve an acceptable signal-to-noise ratio [s/n], and they are difficult to encode in any effective way so that pulse-compression techniques are difficult to apply.

In our prior international applications PCT/AU01/00247, PCT/AU02/01129 and PCT/AU04/00242 we disclosed sodar techniques using long pulse-compression-encoded transmitted pulses—called 'chirps' for short—that allowed 'listening while sending', so long as the received echoes were digitally processed using matched filters tailored to the encoding used in the chirps. Matched filtering is a well know technique practiced in radar and may be effected in the frequency domain (sometimes called the Fourier domain) or in the time domain by correlation methods. In the work associated with our prior patent applications, Chirp lengths of more than 40 seconds were demonstrated, the length being dependent upon the processing power devoted to the DSP (digital signal processing) techniques that implement the matched filtering. Very high s/n was achieved relative to the conventional transmit-then-listen methods as the total energy of a long chirped pulse can often be 1000 times that of a very short high-intensity pulse used in send-then-listen techniques.

However, we believe that there are situations where there may be advantage in using a hybrid system; that is, one which operates on a send-then-listen basis but has at least some of the s/n advantages of a chirped, long-pulse listen-while-sending system of the type disclosed in our above-mentioned prior patents.

BRIEF SUMMARY OF THE INVENTION

From one aspect, the invention relates to sodar systems and methods that employ a set of encoded transmit pulses, each successive pulse of the set having a duration that is longer than the preceding pulse and successive pulses being time-spaced by increasing intervals during which echoes from the immediately preceding pulse can be detected. The number of pulses in a set will be determined by the desired range of the sodar system, the minimum number of pulses being two.

Though not essential, the coding of the successive pulses is preferably substantially the same and the coding method is preferably adapted for matched filter processing. In that case, such pulses can be called chirps within the meaning employed in our prior patent applications. In one preferred option, each pulse may be frequency modulated so that the frequency increases or decreases in a linear manner for the duration of the chirp. Preferably each pulse has the same starting frequency or tone and the same finishing frequency or tone. The rate at which the tone increases (or decreases) will then, of course, decline as the pulses get longer, but each pulse will have effectively the same bandwidth. This allows greater simplicity in the design of the receiver system because the bandwidth of each pulse is the same and the same matched filter, together with and much of the same DSP processes, can be used to extract echo data from the received signals following the end of the transmission of each pulse.

Though there will be a 'dead zone' for each chirp during which returned signals cannot be received because transmission of the respective pulse is still continuing, there need be no gaps in the range if the dead zone of one pulse is shorter than the range band covered by the preceding pulse, except of course for the dead zone of the first pulse which cannot be covered. However, by making the first pulse short, the dead zone associated with that pulse can be minimal if not negligible. The portion a pulse that is not dead zone is the 'range band' because that portion will generate return signals that can be received and that will contribute a section of the system range. The range band will generally be most of the total length or duration of the pulse.

According to another aspect, the range dead-zone of a system can be further minimized by alternately employing two (or more) different sets of chirps, one set being used to 'fill in' the dead-zones of the preceding set.

Finally, this specification should be read in conjunction with our co-pending Australian patent applications entitled "Narrow Chirp Sodar" which teaches the use of chirped sodar signals with a bandwidth/chirp centre frequency ratio of between 0.1 and 0.2 and "Sodar Methods and Apparatus" which teaches the use of time domain matched filtering of received sodar signals in a listen-while-sending sodar.

Having portrayed the nature of the present invention, a particular example will now be described with reference to the accompanying drawings. However, those skilled in the art will appreciate that many variations and modifications can be made to the chosen example while conforming to the scope of the invention as defined in the following claims.

DETAILED DESCRIPTION OF THE INVENTION

Before describing the chosen examples, it should be noted that the layout of transmitters and receivers and the processing of the received echoes can conveniently follow the teachings of our prior patent applications mentioned above. In those patent applications we showed how atmospheric anomalies could be graphically indicated, how the speed and bearing of airflow at any desired range (altitude) could be determined and depicted and how other variables such as temperature, humidity, wind-shear and total energy could be estimated or approximated. Accordingly, the description of received signal manipulation using DSP techniques (typically employing Fourier transformations) contained in our prior patent applications is incorporated herein and should be read in conjunction with the following description.

However, as will be described below, recent developments in acoustic transducers allow significant economies and simplifications with respect to the systems described in our above mentioned patent applications.

Figure 1:
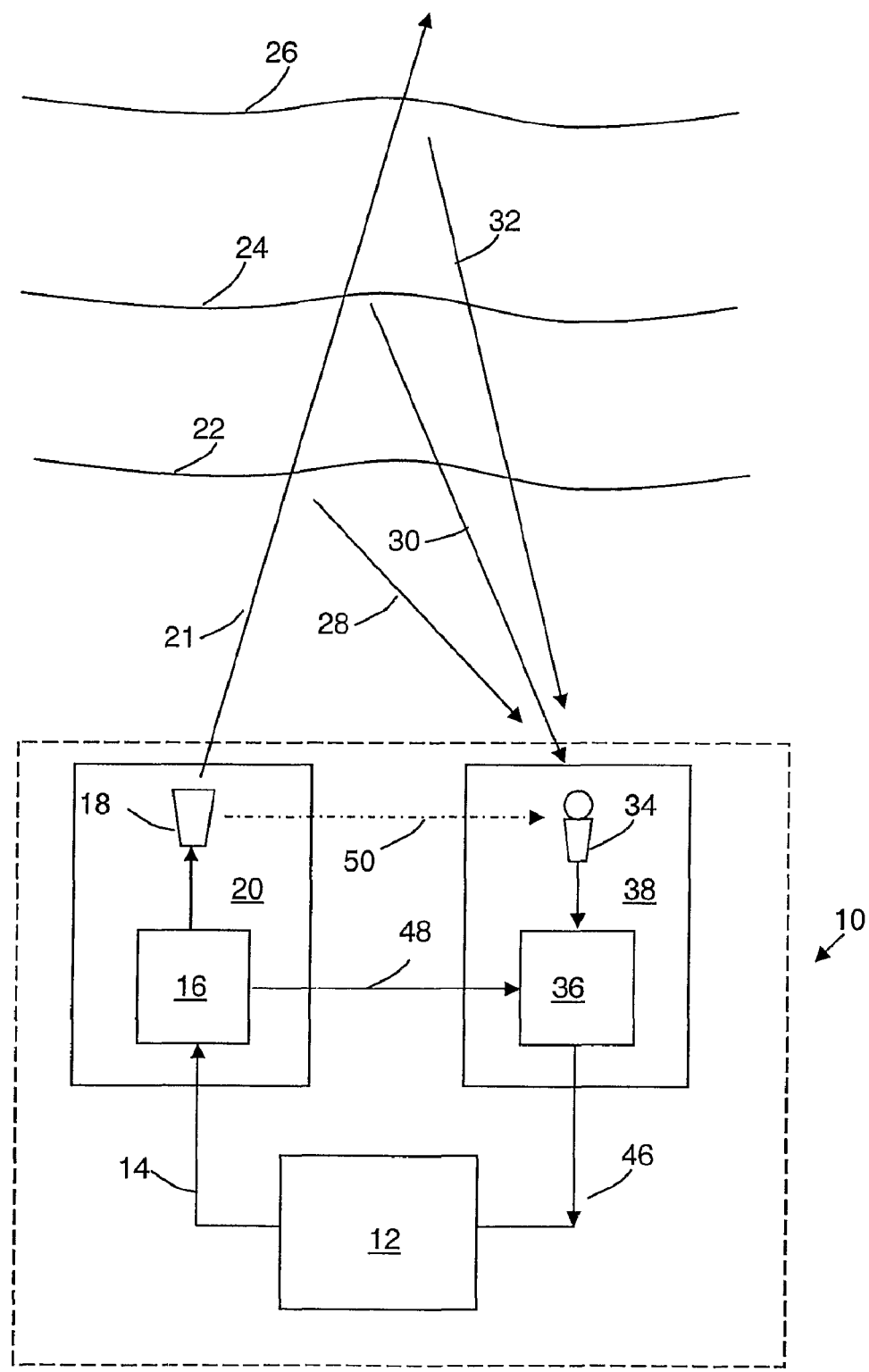
FIG. 1 is a diagrammatic side elevation of the sodar system of the example in operation.

The basic components and operation of known apparatus suitable for use in the chosen examples are illustrated in FIG. 1. A monostatic sodar system 10 consists of a processor and display unit 12 that generates the signal for each chirp to be transmitted and outputs it on line 14 to an audio driver circuit 16 which drives a loudspeaker 18. Driver 16 and loudspeaker 18 serve as the sodar transmitter 20 of system 10. Loudspeaker 18 delivers the chirp in the form of an acoustic beam 21 upward into the atmosphere. Discontinuities such as those indicated at 22, 24 and 26 result in echoes 28, 30 and 32 being returned to a microphone 34 and associated signal conditioner and detector 36 that serve as sodar receiver 38 of system 10. Receiver 38 outputs extracted echo signals on line 46 to processor 12 for analysis. Detector 36 implements a Fourier domain matched-filter (not shown) to extract echo signals from noise and for that purpose receives a reference input on line 48 representing each transmitted chirp (though such a reference signal can equally well be supplied by processor 12).

Finally, it will be appreciated that in a monostatic system where transmitter and receiver are located close together, such a strong direct acoustic signal, indicated by arrow 50, will be received at microphone 34 during the transmission of a chirp that it will totally swamp any returned echo signal and may, indeed, damage detector circuit 36. Accordingly receiver 38 is switched off during transmission.

The first example of the implementation of at least one aspect of the present invention is a two-chirp sodar signal comprising an initial short chirp 60 (FIG. 2) of 100 ms followed by a 600 ms interval during which listening takes after which a second chirp 62 (FIG. 2) of 600 ms duration is transmitted that is followed by a listening period of 1800 ms. Each chirp is encoded as a linear variation in tone (frequency) from 800 to 1500 Hz, the glissandi being accomplished in a shorter time in the first chirp than in the second. The encoding, timing, spacing and repetition of the sodar signal are determined by processor unit 12. As already noted, chirps with other time/frequency/amplitude/phase encoding may be employed but are preferably those suited to matched-filter processing techniques.

Figure 2:
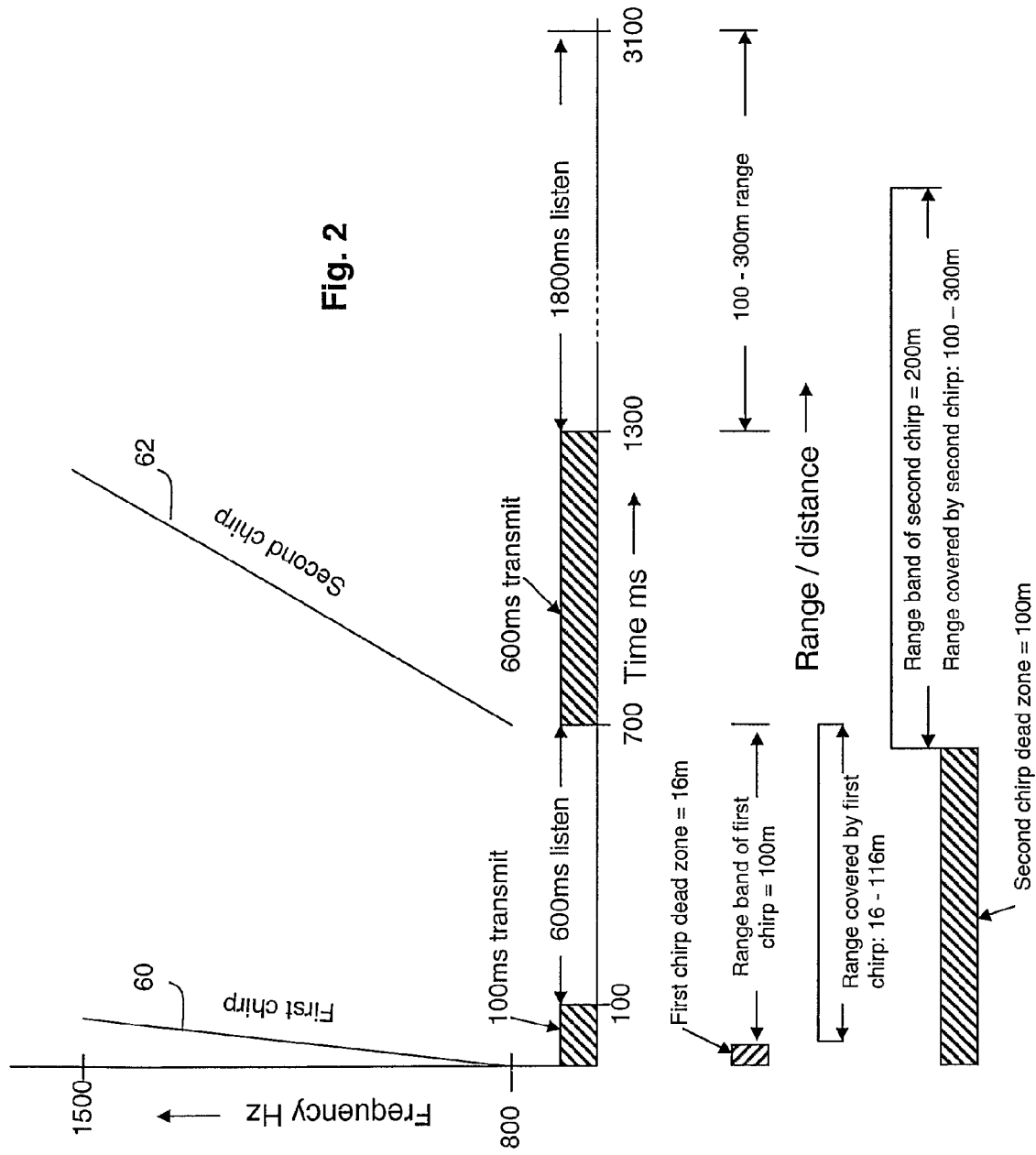
FIG. 2 is a graph of frequency vs. time graph showing the timing of transmission and listening operations for a two-pulse set of the first example, including data relating to range distances.

With reference to the graph-like diagram of FIG. 2, the first chirp 60 commences transmission at time zero with a frequency of 800 Hz and ends after 100 ms with a frequency of 1500 Hz, the frequency of the chirp (in this example) increasing linearly with time. For the sake of illustration it is assumed that, at 100 ms when the transmission of chirp 50 ends, the head of first chirp 60 will have reached atmospheric anomaly 24 just as the tail leaves loudspeaker 18, which (assuming the speed of sound to be 330 m/s) will be at an altitude of about 30 m. This means that the first echo that can be detected will be echo 28 that will have commenced its return from an altitude of 15 m and will start arriving at receiver 38 as soon as listening commences at 100 ms. Echo 30 will be received 50 ms later, the altitude of anomaly 24 being 30 m. Since echoes from below 16 m cannot be detected, the range 0-16 m is referred to as the 'dead zone' of the first chirp.

Receiver 38 accepts echoes for 600 ms after the end of chirp 60 before switching off at 700 ms to allow the second chirp 62 to be transmitted. It is assumed that, at that time, the tail of echo 32 will have just been received, so that the round trip for chirp 10 and complete echo 32 has taken 700 ms making the incremental range zone of chirp 60 100 m and the altitude of anomaly 26 about 116 m. Thus, as indicated in FIG. 2, the altitude range covered by the use of chirp 60 is 16-116 m.

FIG. 2 also depicts the situation for second chirp 62 that commences transmission at 700 ms for a period of 600 ms and terminates at 1300 ms after which it is followed by a listening time of 1800 ms that ends at 3100 ms. Applying the same reasoning as for the first chirp 60, it can be seen that the 600 ms duration of second chirp 62 creates a range dead-zone of about 100 m; that is, no echoes can be detected from the second chirp from atmospheric anomalies below 100 m. However, the listening time of 1800 ms represents a range increment of about 300 m so that echoes can be detected from atmospheric anomalies between 100 m and 400 m, providing an overlap of about 16 m with the 16-116 range of first chirp 60. In practice, however, some buffer period or guard time must be been allowed for the transition between the send and listen modes and this will substantially reduce range overlap.

Figure 3:
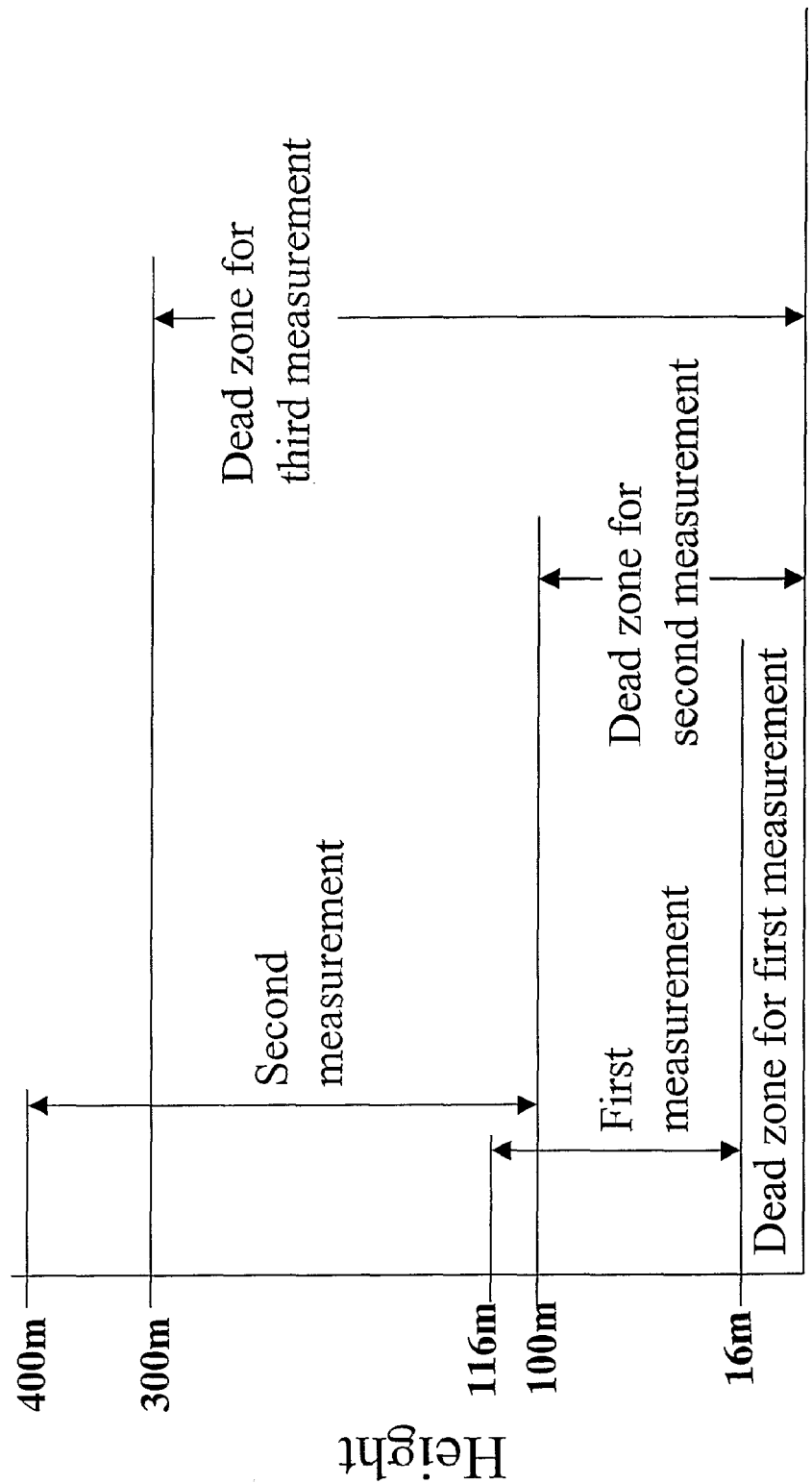
FIG. 3 is an alternate chart-like representation of the timing of transmission and listening operations of the two-pulse set indicated in FIG. 2.
Figure 4:
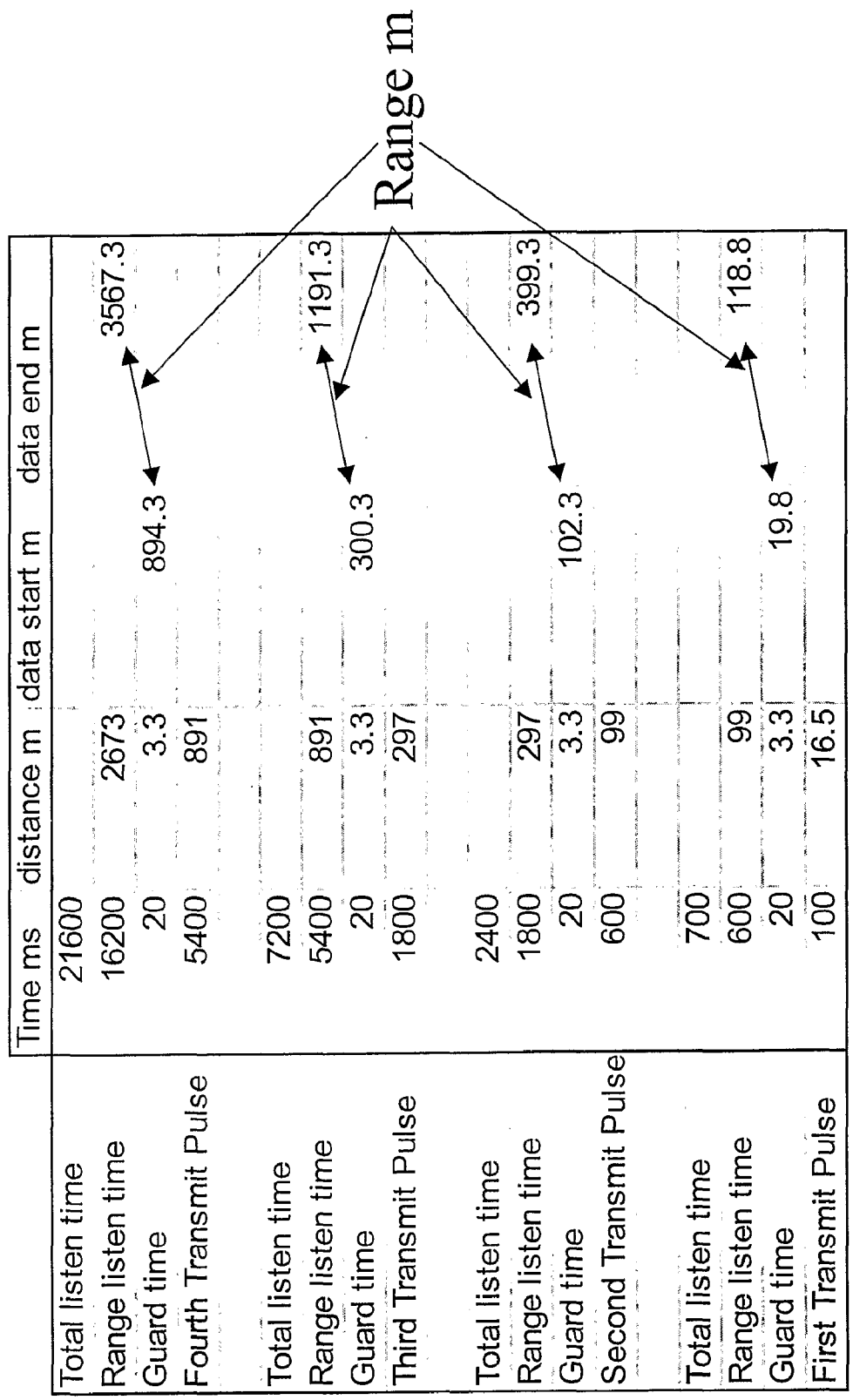
FIG. 4 is a tabulation setting out transmission, listening and range data applicable to a four-pulse set comprising the second example in which the first two pulses are the same as those of the first example.
Figure 7:
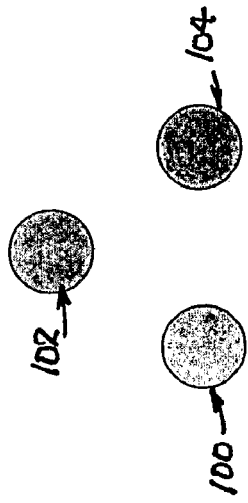
FIG. 7 is a similar view to that of FIG. 6 showing a set of three transducer units that may be used in the systems of the first and second examples.
Figure 6:
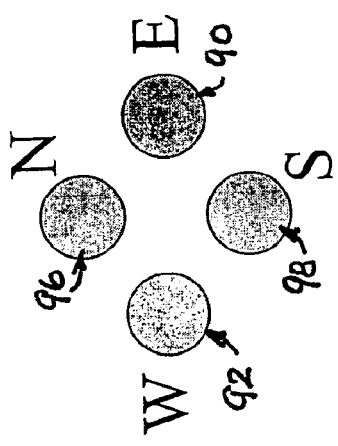
FIG. 6 is a diagrammatic plan view of a set of four transducer units, arranged on the cardinal points of the compass, that may be used in the systems of the first and second examples.

The self-explanatory chart of FIG. 3 provides and alternative way of depicting the ranges, times and dead zones associated with the two chirp set shown in FIG. 2. Like FIG. 2, FIG. 3 suggests that any desired range can be covered using chirp sets and, by way of second example, FIG. 4 provides a tabulation showing how third and fourth chirps can be used in a set to cover a range of 16.5 m to 3567 m. The general is that the dead zone associated with a chirp (other than the first) should be no greater than the effective range covered by the preceding chirp.

There may be exceptional signal processing or other constraints (eg resonance) in some systems that result in significant time gaps between the transitions from chirp transmission to echo reception/processing and/or from reception/processing to chirp transmission. Such gaps may then result in the dead zone associated with one chirp being greater than the range covered by the preceding chirp. Though the most desirable remedy is to remove the constraints that cause the problem, the whole range can be covered without any gaps if two different sets of chirps are used in succession, such that the spacing and timing of the chirps or the second set cover the gaps created by the first set, and vice versa.

As already noted above, suitable arrangements of transmitters (loud speakers) and receivers (microphones), along with suitable DSP techniques for processing receiver signals have been disclosed in our prior patent applications. However, it has now been found that certain types of commercially available loudspeaker driver and horn combinations will function surprisingly well as microphones. Using such transducers can simplify and minimize the physical structure of the transmitter receiver assembly. Examples of suitable transducers that will function in this way are paging horn speakers SC-610/SC, SC-615/SC and SC-630M manufactured by TOA (www.toa.jp/) which are particularly sensitive as microphones to audio signals in the range 800 to 1500 Hz. FIGS. 5-8 illustrate some possible configurations using these transducers.

Figure 5:
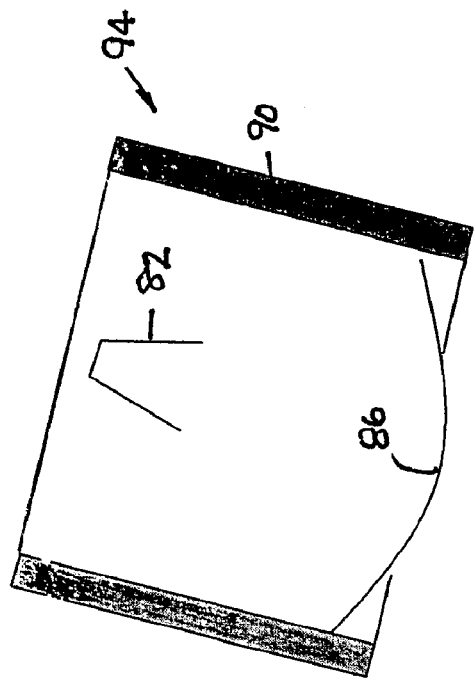
FIG. 5 is a diagrammatic sectional side elevation showing two combined transducer units that may be used in the systems of the first or second example.
Figure 8:
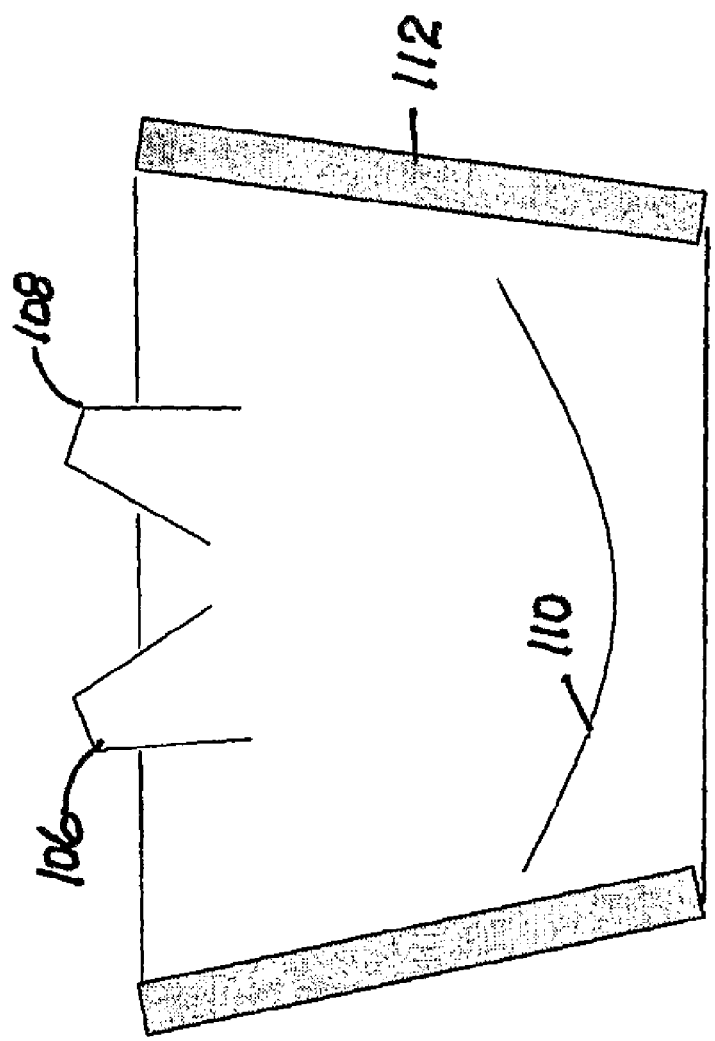
FIG. 8 is a diagrammatic sectional side elevation of a double transducer unit that may be used in the systems of the first and second examples.

FIG. 5 shows two such horn transducers 80 and 82 facing downwards above respective parabolic acoustic reflecting dishes 84 and 86, horn 80 and its dish 84 being housed within a tubular acoustic insulating baffle 88 and horn 82 and its dish 86 being housed within a similar baffle 90. Dish 84 is slightly angled toward the West while dish 86 is slightly angled toward the East. Horn 80, dish 84 and baffle 88 form a West horn assembly 92 while horn 82, dish 86 and baffle 90 form an East horn assembly 94. Similar North and South horn assemblies 96 and 98 complete the set up, the four horn assemblies being shown in plan view in FIG. 6. Our prior patent applications disclose how the received signals derived from such a collection of receivers can be processed to reveal important characteristics of the atmosphere within range. Though computationally more challenging, the same results can be achieved by the use of three horn assemblies 100, 102 and 104, as shown in plan view in FIG. 7. Other configurations are also possible. For example, as shown in FIG. 8, two or more horns 106 and 108 may be mounted over a common dish 110 and within a common baffle 112, the horns being slightly angled toward or away from one another to monitor opposite portions of the atmosphere. This arrangement was also suggested in our prior patent applications. What is different here is that the horns or tranducers function both as loudspeakers and microphones so that separate dishes are not required for transmission and reception.

While various examples of the implementation of aspects of the present invention have been described, it will be appreciated by those skilled in the art that many variations and of the described examples are possible and that many other examples can be devised or postulated without departing from the scope of the invention as set out in the following claims.

The invention claimed is:

1. A method for atmospheric sounding over a system range using sodar, including the steps of:
   transmitting down-range a set of encoded acoustic pulses of graded time duration with a time interval between consecutive pulses,
   receiving acoustic signals returned from the atmosphere only when pulses are not being transmitted, and
   processing the received signals using matched filtering to extract signal echo-related information during each interval between pulses of the set by making use of the encoding of the pulses,
   wherein each successive pulse of said set is longer than the immediately preceding pulse and each successive time interval between pulses of the set is of increasing duration with respect to the immediately preceding time interval.

2. A method according to claim 1 including the steps of: encoding each pulse of the set in the same manner.

3. A method according to claim 1 including the steps of:
   frequency-modulating each pulse of the set by linearly varying the frequency of the pulse over the duration of the pulse between two frequency limits, said frequency limits being the same for each pulse so that each pulse has substantially the same bandwidth but so that the rate of frequency variation depends on pulse duration, and
   processing the received signals using frequency-domain matched filtering.

4. A method according to claim 1 including the step of:
   employing one and the same acoustic transducer for transmitting said set of pulses and for receiving said signals from the atmosphere.

5. A method for atmospheric sounding over a system range using sodar, including the steps of:
   transmitting down-range a set of encoded acoustic pulses of graded time duration with a time interval between consecutive pulses,
   receiving acoustic signals returned from the atmosphere only when pulses are not being transmitted, and
   processing the received signals using matched filtering to extract signal echo-related information during each interval between pulses of the set by making use of the encoding of the pulses wherein:
   each pulse has an associated range band within which signals returned from the atmosphere can be received after the transmission of the pulse has ceased,
   the initial portion of each pulse comprises a dead zone period for that pulse during which signals returned from the atmosphere cannot be received because transmission of said pulse has not ceased,
   the dead zone of the second and each succeeding pulse is longer than the dead zone of the preceding pulse, and
   the dead zone of each pulse with the exception of the first is no longer than the range band of the preceding pulse, so that there are no portions of the system range from which signals cannot be received except for that portion corresponding to the dead zone of the first pulse.

6. A method according to claim 5 including the step of:
   employing one and the same acoustic transducer for transmitting said set of pulses and for receiving said signals from the atmosphere.

7. A sodar system for use in atmospheric sounding within a system range, the system comprising:
   transmitter means adapted to generate and direct an acoustic beam into the atmosphere within the system range,
   receiver means adapted to receive acoustic signals from the atmosphere, and
   processor means connected to and adapted to control said transmitter means and said receiver means so that:
      said transmitter means generates a set of multiple encoded acoustic pulses of graded duration,
      said receiver means receives acoustic signals returned from the atmosphere only when said acoustic pulses are not being transmitted, and
      said processor means being adapted to process received acoustic signals to extract signal echo-related information therefrom, wherein said processor means is adapted to: generate each successive pulse of said set to be longer than the immediately preceding pulse and to make each successive time interval between pulses of the set of increasing duration with respect to the immediately preceding time interval.

8. A sodar system according to claim 7 wherein said processor means is adapted to encode each pulse of said set in the same manner.

9. A sodar system according to claim 7 wherein said processor means is adapted to:
frequency-modulate each pulse of the set by linearly varying the frequency of the pulse over the duration of the pulse between two frequency limits, said frequency limits being the same for each pulse so that each pulse has substantially the same bandwidth but so that the rate of frequency variation depends on pulse duration, and
process the received signals using frequency-domain matched filtering.

10. A sodar system according to claim 7, wherein:
said transmitter means includes an acoustic transducer for generating the acoustic beam,
said receiver means includes an acoustic transducer for detecting said acoustic signals returned from the atmosphere, and
said acoustic transducers are one and the same device.

11. A sodar system for use in atmospheric sounding within a system range, the system comprising:
transmitter means adapted to generate and direct an acoustic beam into the atmosphere within the system range,
receiver means adapted to receive acoustic signals from the atmosphere, and
processor means connected to and adapted to control said transmitter means and said receiver means so that:
said transmitter means generates a set of multiple encoded acoustic pulses of graded duration,
said receiver means receives acoustic signals returned from the atmosphere only when said acoustic pulses are not being transmitted, and
said processor means being adapted to process received acoustic signals to extract signal echo-related information therefrom wherein:
each pulse has an associated range band within which signals returned from the atmosphere can be received after the transmission of the pulse has ceased,
the initial portion of each pulse comprises a dead zone period for that pulse during which signals returned from the atmosphere cannot be received because transmission of said pulse has not ceased,
the dead zone of the second and each succeeding pulse is longer than the dead zone of the preceding pulse, and
the dead zone of each pulse with the exception of the first is no longer than the range band of the preceding pulse, so that there are no portions of the system range from which signals cannot be received except for that portion corresponding to the dead zone of the first pulse.

12. A sodar system according to claim 11 wherein:
said transmitter means includes an acoustic transducer for generating the acoustic beam,
said receiver means includes an acoustic transducer for detecting said acoustic signals returned from the atmosphere, and
said acoustic transducers are one and the same device.

* * * * *